(12) United States Patent
Chouhan

(10) Patent No.: US 8,707,157 B1
(45) Date of Patent: Apr. 22, 2014

(54) SYSTEM AND METHOD FOR PRE-POPULATING FORMS USING STATISTICAL ANALYSIS

(75) Inventor: Yashwant Singh Chouhan, Bangalore (IN)

(73) Assignee: Intuit Inc., Mountain View, CA (US)

( * ) Notice: Subject to any disclaimer, the term of this patent is extended or adjusted under 35 U.S.C. 154(b) by 63 days.

(21) Appl. No.: 13/214,100

(22) Filed: Aug. 19, 2011

(51) Int. Cl.
G06F 17/22 (2006.01)

(52) U.S. Cl.
USPC .......................................... 715/222; 715/224

(58) Field of Classification Search
USPC ................................. 715/221, 222, 224, 226
See application file for complete search history.

(56) References Cited

U.S. PATENT DOCUMENTS

| | | | |
|---|---|---|---|
| 8,311,888 B2 * | 11/2012 | Ramer et al. | 705/14.64 |
| 8,392,472 B1 * | 3/2013 | Gupta et al. | 707/804 |
| 2006/0247915 A1 * | 11/2006 | Bradford et al. | 704/1 |
| 2009/0204881 A1 * | 8/2009 | Murthy et al. | 715/226 |
| 2009/0228281 A1 * | 9/2009 | Singleton et al. | 704/275 |
| 2009/0240569 A1 * | 9/2009 | Ramer et al. | 705/10 |
| 2010/0100568 A1 * | 4/2010 | Papin et al. | 707/794 |
| 2010/0125762 A1 * | 5/2010 | Nie et al. | 714/49 |
| 2010/0161733 A1 * | 6/2010 | Bower et al. | 709/206 |
| 2010/0211863 A1 * | 8/2010 | Jones et al. | 715/224 |
| 2011/0202874 A1 * | 8/2011 | Ramer et al. | 715/810 |
| 2012/0023103 A1 * | 1/2012 | Soderberg et al. | 707/739 |
| 2012/0089908 A1 * | 4/2012 | Miyaki | 715/706 |
| 2012/0166929 A1 * | 6/2012 | Henderson et al. | 715/224 |
| 2013/0055097 A1 * | 2/2013 | Soroca et al. | 715/738 |
| 2013/0268357 A1 * | 10/2013 | Heath | 705/14.53 |

OTHER PUBLICATIONS

White et al., "Predicting User Interests from Contextual Information", SIGIR '09, 363-370 (Jul. 2009).*

* cited by examiner

*Primary Examiner* — Laurie Ries
*Assistant Examiner* — Soumya Dasgupta
(74) *Attorney, Agent, or Firm* — Osha Liang LLP (57) ABSTRACT

In general, in one aspect, the invention relates to a method for populating forms. The method includes: identifying a set of inputs to a form from past users; receiving, from a current user, a request to view the form; identifying temporal data associated with the current user; identifying an internet protocol (IP) address of a computing device of the current user; performing, based on the IP address and the temporal data, a statistical analysis on the set of inputs; determining, based on the statistical analysis, that a statistical threshold corresponding to a field on the form is exceeded; calculating, in response to determining that that the statistical threshold is exceeded, a default value for the field; and sending the default value to the computing device.

13 Claims, 7 Drawing Sheets

Online Order 500 http://www.verymerryflowerco.com

Very Merry Flowers

Complete your order...

Very Merry Flowers

Menu
   > Order Online
About Us
Contact

| | |
|---|---|
| Today's Date: | February 7, 2011 |
| Delivery Address: | Fred Johnson<br>1234 Oeste Dr.<br>Davis, CA 95616 |
| Requested delivery date: | Feb. 14, 2011    v |

Default Value A 505

Requested delivery message:

Happy Valentine's Day. Love, Fred

Default Value B 510

(1) Dozen premium long stem red roses    $49.99
(1) Cupid teddy bear    $9.99

Delivery fee:    $8.00
    Tax:    $5.40
    Projected gratuity amount**:

<u>Total</u>:    $73.38

Submit Order

SYSTEM AND METHOD FOR PRE-POPULATING FORMS USING STATISTICAL ANALYSIS

BACKGROUND

Statistical analysis involves aggregating and interpreting data. Modern computing devices are capable of performing such analysis with ever-increasing speed and efficiency. Software statistical analysis tools now have access to a wealth of available data. Everything from financial information and demographic data to user behavior and interests is aggregated by pervasive networks of data centers and devices. Mathematicians and engineers struggle to draw meaningful conclusions from this information.

As the abundance and availability of data has increased dramatically, so too has the complexity of the user experience. Users are expected to learn new software and to perform complex tasks with varying amounts of guidance. Ironically, software developers have created vast libraries of help information and resources in order to assist the user. Navigating such resources in search of specific information can be a daunting task. As a result, many problems in the usability and design of software relate to what is commonly referred to as "information overload."

For example, in the area of tax preparation, existing software tools are capable of maintaining compliance with ever-changing government regulations and requirements. This causes uncertainty in the user experience. Users must learn and adapt to these changes in the program, while the delivery of content to the user remains somewhat static.

SUMMARY

In general, in one aspect, the invention relates to a method for populating forms. The method includes: identifying a set of inputs to a form from past users; receiving, from a current user, a request to view the form; identifying temporal data associated with the current user; identifying an internet protocol (IP) address of a computing device of the current user; performing, based on the IP address and the temporal data, a statistical analysis on the set of inputs; determining, based on the statistical analysis, that a statistical threshold corresponding to a field on the form is exceeded; calculating, in response to determining that that the statistical threshold is exceeded, a default value for the field; and sending the default value to the computing device.

In general, in one aspect, the invention relates to a computer-readable storage medium storing instructions for populating forms. The instructions are configured to execute on a processor and include functionality to: identify a set of inputs to a form from past users; receive, from a current user, a request to view the form; identify temporal data associated with the current user; identify an internet protocol (IP) address of a computing device of the current user; perform, based on the IP address and the temporal data, a statistical analysis on the set of inputs; determine, based on the statistical analysis, that a statistical threshold corresponding to a field on the form is exceeded; calculate, in response to determining that that the statistical threshold is exceeded, a default value for the field; and send the default value to the computing device.

In general, in one aspect, the invention relates to a computer system for populating forms. The computer system includes: a forms repository including a set of inputs to a form populated by past users; a processor; and a forms server executing on the processor and including functionality to receive, from a current user, a request to view the form, identify temporal data associated with the current user, identify an internet protocol (IP) address of a computing device of the current user, access the set of inputs in the forms repository, perform, based on the IP address and the temporal data, a statistical analysis on the set of inputs, determine, based on the statistical analysis, that a statistical threshold corresponding to a field on the form is exceeded, calculate, in response to determining that that the statistical threshold is exceeded, a default value for the field, and send the default value to the computing device.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for populating forms. In general, embodiments of the invention identify a set of inputs to a form from a group of past users. A request to view the form is then received from a new user. Statistical analysis is used to calculate a default value for one or more fields on the form based on the set of inputs. The form is then displayed to the new user with the default value(s).

Figure 1:
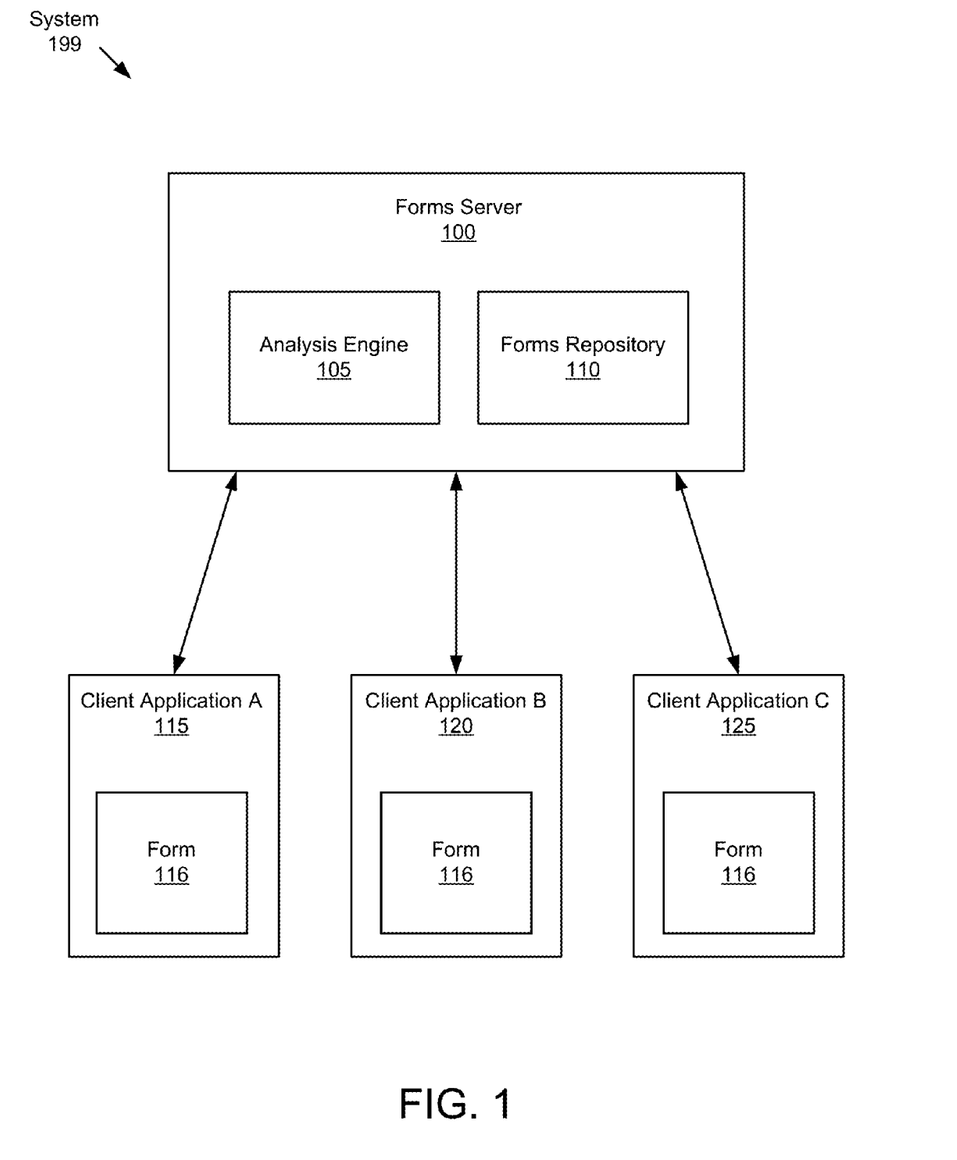
FIG. 1 shows a schematic diagram in accordance with one or more embodiments of the invention.

FIG. 1 shows a system (199) in accordance with one embodiment of the invention. As shown in FIG. 1, the system has multiple components including a forms server (100), an analysis engine (105), a forms repository (110), a set of client applications (e.g., client application A (115), client application B (120), client application C (125)), and a form (116) present on each of the client applications. The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the forms server (100) is a software application or a set of software applications executing on one or more hardware processors. The software application may be a web application in a server of a data center and/or a cloud computing application in a network distributed system. Alternatively, the forms server (100) may be a software application residing in a personal computing device (e.g., smartphone, laptop computer, desktop computer, etc.) of a user. In one or more embodiments of the invention, the forms server (100) is integrated within or operatively connected to a financial management application (FMA), a payroll application, or any other type of application.

In one or more embodiments of the invention, the forms server (100) includes functionality to obtain a set of inputs to a form from one or more users. The forms server (100) may provide a form (116) to one or more client applications (e.g., client application A (115), client application B (120), client application C (125)) residing on client computing devices. The forms server (100) may receive input to the form (116) and may aggregate these inputs in the forms repository (110). One or more forms may be displayed to the user, by a client application, on a client computing device such as a laptop computer, a smartphone, a vehicle navigation system, and/or any other computing device capable of displaying the form. Examples of a form (116) may include, but are not limited to, a tax form, a web page (e.g., a checkout/payment/shipping page of an ecommerce website), a dialog box, a profile page of a user, and/or any electronic document or object having one or more fields capable of accepting user input.

In one or more embodiments of the invention, the forms server (100) includes functionality to obtain temporal data associated with a user. Temporal data may be any time-sensitive data associated with the user, such as historical data entered by the user into one or more fields and/or user interfaces. Examples of temporal data include, but are not limited to, data from a previous year's tax return, cached data from a computing device of the user, past data obtained from a profile of a user, historical transactions from a bank account of a user, transaction data obtained from a website of a merchant or service provider, search history of a user, frequency of user visits to a website, one or more dates associated with a user's financial transactions, one or more event dates obtained from a calendar of a user, past appointment times of a user, and/or any other temporal data associated with a user. Examples of temporal data may also include metadata and/or analysis data obtained by analyzing usage patterns of a user over time. For example, a tax preparation application may identify one or more tax areas identified based on previous tax returns of a user. In this example, the tax preparation application uses the tax areas to calculate default values for one or more future tax returns of the user.

In one or more embodiments of the invention, the forms server (100) includes functionality to obtain a set of geographic data associated with a user. Examples of geographic data may include, but is not limited to, locations identified based on financial records obtained from a financial institution (e.g., merchant locations), call history of a user's telephone or cellular phone (e.g., identifying locations based on area code or phone numbers contacted by the user), geospatial data and/or metadata obtained from a mobile device of a user (e.g., image metadata, global positioning system (GPS) coordinates from a mobile device having a GPS receiver, etc.), a geographic location identified based on an internet protocol (IP) address and/or media access control (MAC) address of a mobile device of a user, one or more addresses obtained from a user profile of a website, and/or one or more billing and/or shipping addresses obtained from a website (e.g., an online banking or ecommerce website). For example, the forms server (100) may identify "checkins" to a geographic location on a social networking website. Based on the checkins, the forms server (100) may determine that a user periodically performs an act or attends an event corresponding to the geographic location. The forms server (100) may then use the geographic location to calculate a default value for one or more fields on a form displayed to the user.

In one or more embodiments of the invention, the forms server (100) includes functionality to obtain and/or identify a statistical threshold. The statistical threshold may include one or more criteria for calculating a default value for a field in a form. The statistical threshold may also include one or more conditional statements (e.g., a mathematical formula) which evaluate to a Boolean result. Thus, in one or more embodiments of the invention, if the conditional statement evaluates to TRUE, the statistical threshold is deemed to be exceeded. For example, the forms server (100) may calculate a percentage of a user's inputs to a form which correspond to one or more categories (i.e., business, personal, charitable donation, education, etc.). The forms server (100) may then compare the percentage to a predefined threshold percentage identified by the statistical threshold (e.g., 50%). In this example, if the percentage of user inputs deemed to fall under the "business" category exceeds 50%, the forms server (100) determines that the statistical threshold is exceeded.

In one or more embodiments of the invention, the statistical threshold may require comparison of one or more geographic, temporal, and/or external data items defined by the statistical threshold. The statistical threshold may be deemed exceeded if a trend is identified based on the comparison and/or if any other predefined criteria is met.

In one or more embodiments of the invention, the forms server (100) includes functionality to perform statistical analysis on a set of inputs to one or more forms. The forms server (100) may be configured to identify one or more trends based on a mode, average, median, and/or other aggregate data identified based on the set of inputs. The statistical analysis may use geographic data, temporal data, and/or any data relevant to the form(s) and/or user. For example, the forms server (100) may be configured to obtain input from a user on a website of an airline. In this example, prior to displaying a search page to the user, the forms server (100) obtains an IP address of a computing device of the user and matches the IP address to San Francisco, Calif. Accordingly, the forms server (100) then populates a search field on the search page with San Francisco International Airport. In another example, the forms server (100) identifies a set of business expenses in a financial management application of the user. In this example, the forms server (100) aggregates the business expenses which are deductible from the prior year's tax return and prompts the user to import the identified expenses into a tax preparation application. Continuing the example, the forms server (100) then populates one or more tax forms related to the business expenses within the tax preparation application.

In one or more embodiments of the invention, the forms server (100) includes functionality to identify one or more people, places, and/or events based on the statistical threshold. The forms server (100) may identify an event taking place within a predefined proximity of a geographic location of the user. The forms server (100) may also match a business address or the home address of a person to the geographic location. For example, an ecommerce website of a merchant may identify a geographic location of the user based on one or more settings on a client computing device of the user (e.g., operating system time zone, locale settings, etc.). The forms server (100) then tailors the content of the website to the geographic location. Additionally, in this example, the forms server (100) identifies a store location within the geographic location as a default store location for shipping/delivery and pre-populates the store address in one or more shipping/delivery fields on the website. In one or more embodiments of the invention, the forms server (100) matches an event to a commonly entered value of a field on the form. In this case, the forms server (100) may identify a name of the event based on that value. For example, a commonly entered form value may correspond to an order for concert tickets, a holiday celebration, a tax audit meeting during a particular month, and etc.

In one or more embodiments of the invention, the forms server (100) includes functionality to determine that a statistical threshold is exceeded. The forms server (100) may perform any number of calculations in order to evaluate the statistical threshold. Evaluating the statistical threshold may include matching user input data to a regular expression search string, comparing input data to a minimum value based on historical user data, matching user input to a trending data item, and/or comparison of user data against one or more aggregate data items. Based on a statistical analysis, the forms server (100) may determine that one or more criteria defined by the statistical threshold is exceeded.

The forms server (100) may obtain data required by the statistical threshold according to a predefined periodic schedule and/or based on a triggering event. For example, the forms server (100) may scrape data from a user's profile on a website or may import data from a financial management application (FMA) of the user upon opening the FMA.

In one example, the forms server (100) is integrated with a software defect tracking system. The system includes large forms which contain many fields whose value may repeat for a given user. Initially, the forms server (100) does not populate default values in the forms. After the user has entered a predefined number of inputs, (i.e., fills in a few forms), the forms server (100) detects a user to project relationship and begins offering a default value for the project name. In this example, the forms server (100) performs a statistical analysis which is unique to each field or a set of one or more fields on a form (116). During an analysis, the forms server (100) matches commonly entered inputs from the user's other projects to those of other users (e.g., for the current project). If at least 20% of the inputs match with an accuracy of 90% or more, a statistical threshold is deemed to be exceeded and a mode value for the field is chosen as the default value.

In another example, the forms server (100) is operatively connected to a theatre's online ticketing portal. When a user accesses the portal, the forms server (100) performs a statistical analysis using the user's purchase history and a set of previous ticket sales within a time period of the last two hours. In this example, the forms server (100) identifies a trend among the recent ticket sales. Specifically, the forms server (100) identifies a statistical threshold requiring that at least 30% of the tickets sold in the two hour window are for the same movie. The forms server (100) analyzes the ticket sales and determines that 50% of the ticket sales are for a newly released science fiction movie. The statistical threshold also requires that the movie match at least one movie genre identified as an interest of the user. The forms server (100) determines, based on the user's previous ticket purchases, that the user has purchased at least one ticket to a science fiction movie in the past two months. Based on these determinations, the statistical threshold is deemed to be exceeded. Upon determining that the statistical threshold is exceeded, the forms server (100) pre-populates a field in the online ticketing portal with the name of the science fiction movie.

In another example, a user calls a taxi service's call center in order to request a ride. In this example, the forms server (100) is integrated with the telephone routing system. The forms server (100) identifies the user based on a telephone number and retrieves a set of past orders of the user. The forms server (100) identifies a statistical threshold requiring that the user use the same location for pickup at least 60% of the time. The forms server (100) determines, based on a statistical analysis of the past orders, that the user has requested the same pickup location 68% of the time, and that accordingly, the statistical threshold is exceeded. The forms server (100) then pre-populates an order form with the pickup location as a default value and displays the form to a service representative at the call center.

Figure 2:
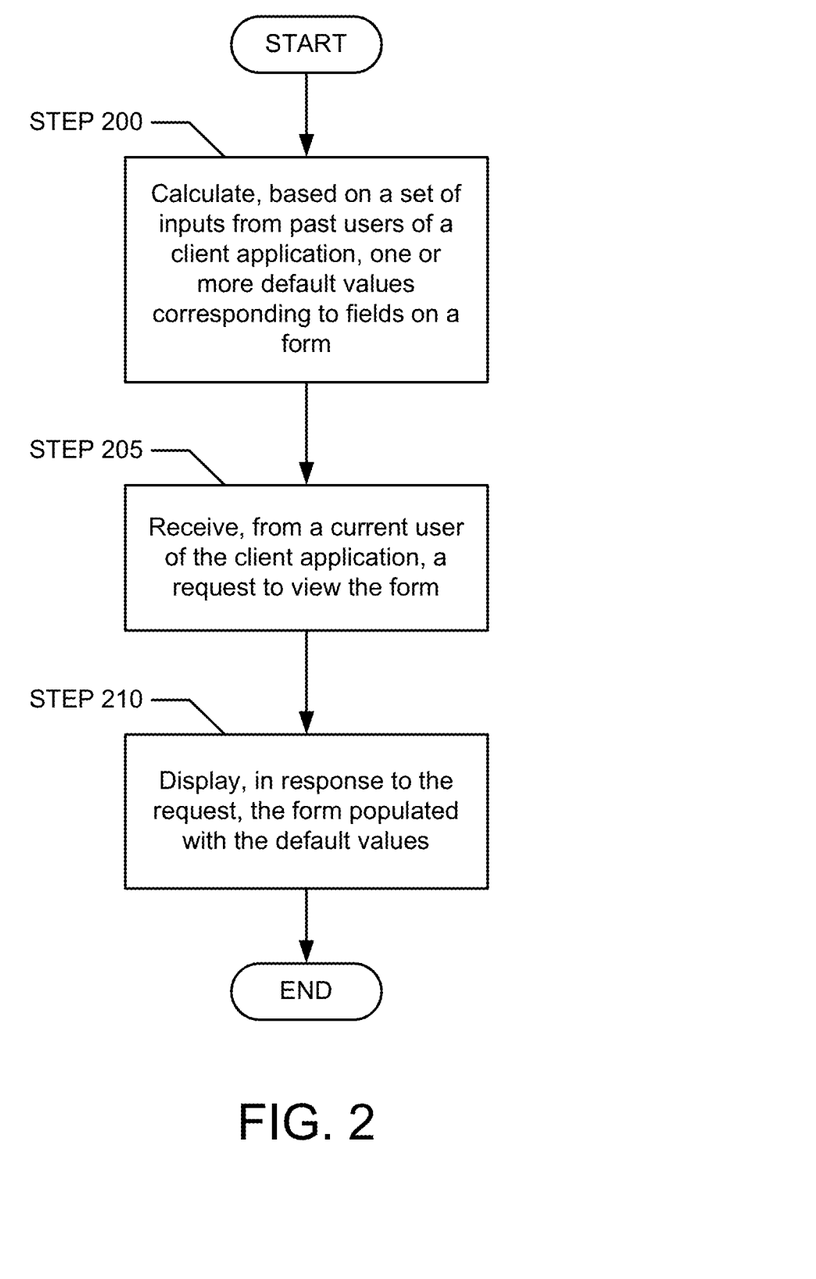
FIG. 2-4 shows flowcharts in accordance with one or more embodiments of the invention.

FIG. 2 shows a flowchart of a method for populating one or more fields on a form. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, in one or more embodiments of the invention, one or more default values corresponding to one or more fields on a form are calculated based on a set of inputs from past users of a client application. The default values may be calculated based on a statistical analysis of the set of inputs with geographic, temporal, and/or other data related to a current user of the client application.

In STEP 205, in one or more embodiments of the invention, a request to view the form is received from a current user of the client application. The request may be sent with instructions to display the form immediately or at a future time. For example, the user may request to view the form by initiating an analysis job. Upon completion and at a future time, the user may be notified that a report including the form is available for viewing.

In STEP 210, in one or more embodiments of the invention, the form populated with the default value(s) is displayed in response to the request. The form may be displayed in the client application while the user waits or may be requested in a first session and displayed to the user in a later session. In one or more embodiments of the invention, a portion or subset of the form may be displayed in response to the request.

Figure 3:
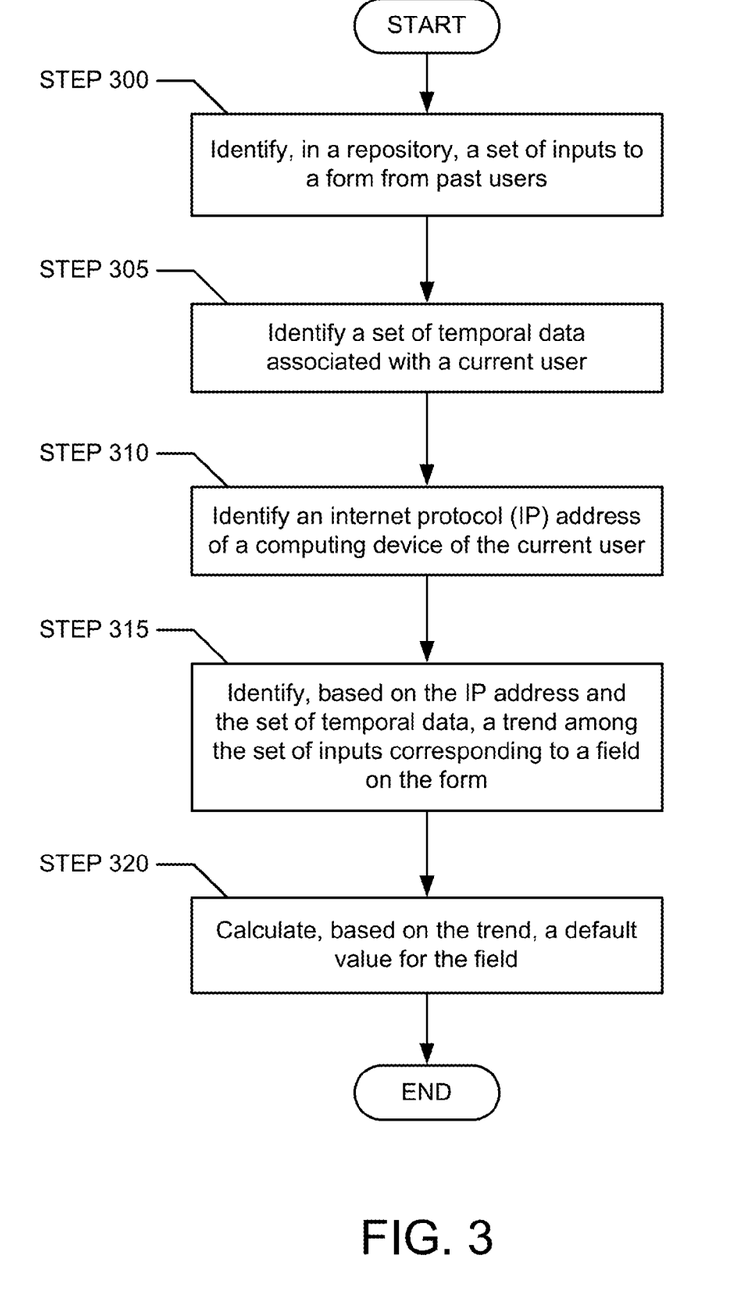

FIG. 3 shows a flowchart of a method for populating one or more fields on a form. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 3 should not be construed as limiting the scope of the invention.

In STEP 300, in one or more embodiments of the invention, a set of inputs to a form from past users are identified in a repository. The set of inputs may be aggregated over a predefined time window and may be stored in the repository by the past users from one or more client applications executing on client computing devices. Alternatively, the set of inputs may be obtained by requesting data from an external data source such as a publicly accessible repository on a government website or server.

In STEP 305, in one or more embodiments of the invention, a set of temporal data associated with a current user is identified. The temporal data may be extracted from metadata on a client computing device, or may be obtained from a calendar application of the user, and/or any other data source having data associated with the current user.

In STEP 310, in one or more embodiments of the invention, an internet protocol (IP) address of a computing device of the current user is identified. The IP address may be obtained by analyzing one or more requests obtained from a computing device of the current user.

In STEP 315, in one or more embodiments of the invention, a trend is identified, based on the IP address and the set of temporal data, among the set of inputs corresponding to a field on the form. The trend may be identified by performing a statistical analysis on the set of inputs using the temporal data and the IP address. The trend may be identified by one or more criteria defined by a statistical threshold. For example, a set of inputs matched to a regular expression string may constitute a trend. In another example, a percentage of identical inputs obtained from a geographic location within a given time period may be identified as a trend.

In STEP 320, in one or more embodiments of the invention, a default value for the field is calculated based on the trend. The default value may be a result of the statistical analysis, may be defined by a statistical threshold, or may be obtained from an external source after determining that a statistical threshold is exceeded.

Figure 4:
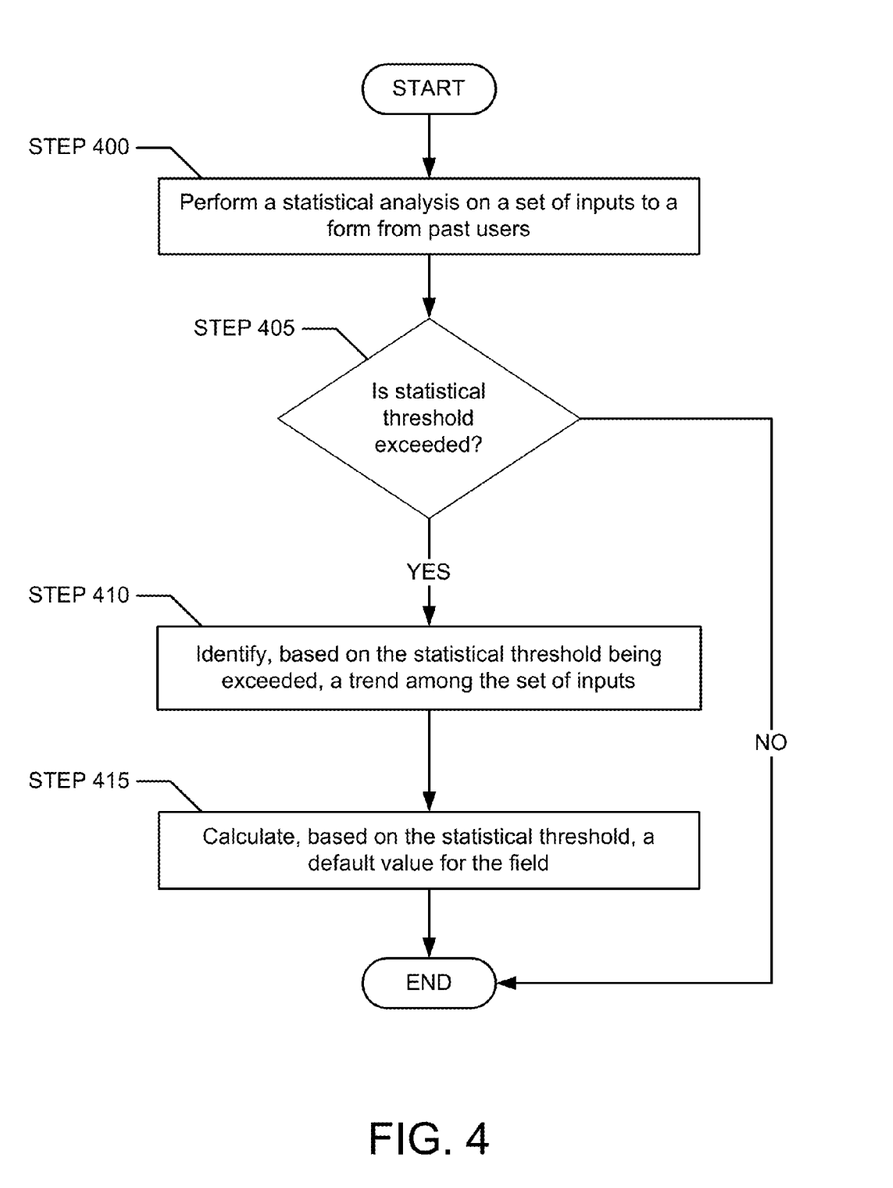

FIG. 4 shows a flowchart of a method for populating one or more fields on a form. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 4 should not be construed as limiting the scope of the invention.

In STEP 400, in one or more embodiments of the invention, a statistical analysis is performed on a set of inputs to a form from past users. The statistical analysis may be performed during a session of a client application, at a future time, or in response to a predefined trigger (e.g., completion of a job, etc.).

In STEP 405, in one or more embodiments of the invention, it is determined whether a statistical threshold is exceeded. If it is determined that the statistical threshold is exceeded, the process proceeds to STEP 410. If it is determined that the statistical threshold is not exceeded, the process ends.

In STEP 410, in one or more embodiments of the invention, a trend is identified among the set of inputs based on the statistical analysis. The trend may be identified based on a criteria defined in a statistical threshold. Alternatively, the trend may be identified in response to the statistical threshold being exceeded. For example, a statistical threshold may require that, over a five day time window, a completed form is submitted to a repository at least three times each day. Upon determining that this threshold is exceeded, the mode value of a field on the form may be identified as a trend.

In STEP 415, in one or more embodiments of the invention, a default value for the field is calculated based on the event. The default value may be a title of the event or may be determined in response to identifying the event.

The following section describes various examples of the invention. The examples are included to aid in the understanding of the invention but are not intended to limit the scope of the invention.

Figure 5:
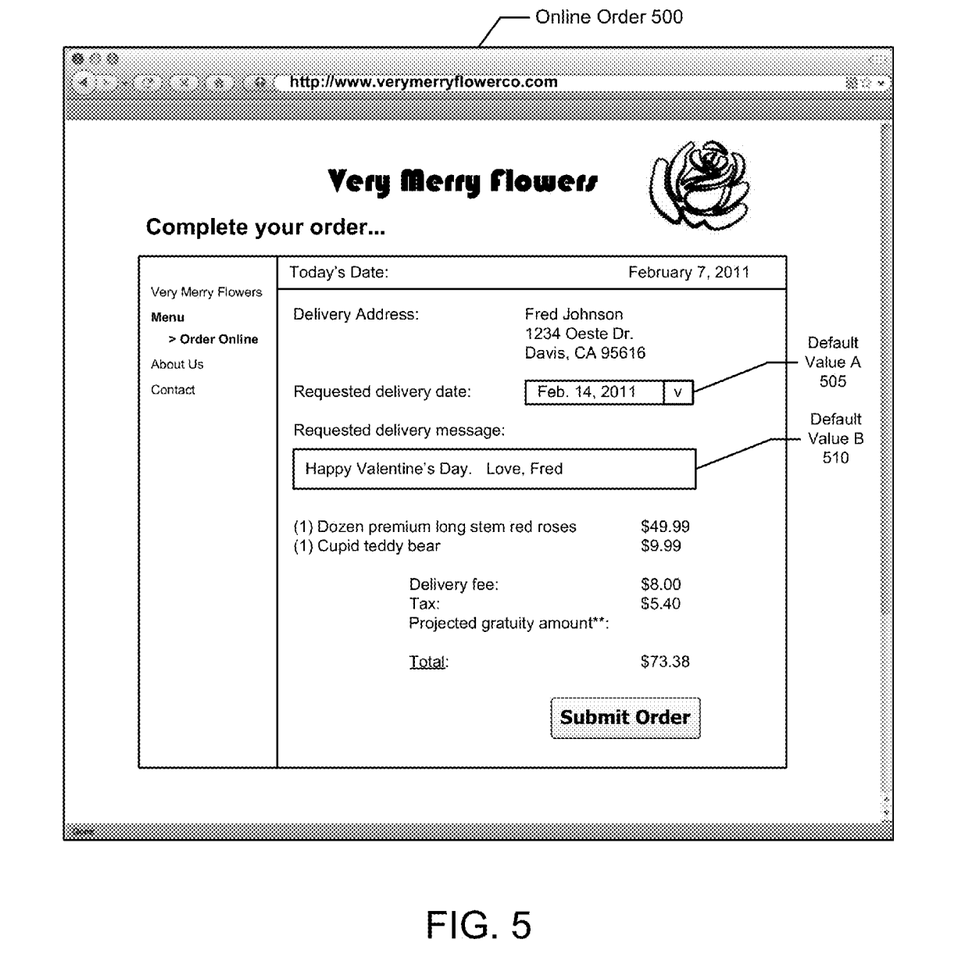
FIG. 5 shows a screenshot of an online order in accordance with one or more embodiments of the invention.

FIG. 5 depicts an example screenshot of an online order (500), in accordance with one or more embodiments of the invention. In this example, a user accesses a website of a merchant on Feb. 7, 2011, to purchase flowers for Valentine's Day. Upon selecting the flowers on a product page, a forms server accesses a database and identifies, within the database, transactions conducted within the previous week. The forms server then obtains an internet protocol (IP) address of the user's computing device, as well as a locale setting from the operating system of the computing device. Based on the locale setting and the IP address, the forms server determines that the user's geographic location is Austin, Tex. Additionally, the forms server identifies metadata within the user's browser cache and extracts the user's name ("Fred") from the on one or more metadata tokens associated with a previous session on the website.

Continuing the example, the forms server then performs a statistical analysis on the transactions using the user's geographic location and name. The forms server first identifies a statistical threshold which requires that at least 60% of the transactions include the word "Valentine" within a message field originally displayed in a message field on an html web page. The statistical analysis calculates that 63% of the transactions conducted within the previous week contain the word "Valentine" in the message field. Accordingly, the forms server determines that the statistical threshold is exceeded.

Continuing the example, the forms server then obtains a standard message string ("Happy Valentine's Day. Love,") defined by the statistical threshold and appends the user's name ("Fred") to create a customized message string ("Happy Valentine's Day. Love, Fred"). The forms server then sets a default value A (505) of a first field on the website to "Feb. 14, 2011" (defined by the statistical threshold) and a default value B (510) of a second field on the website to the customized message string (as depicted by FIG. 5).

Figure 6:
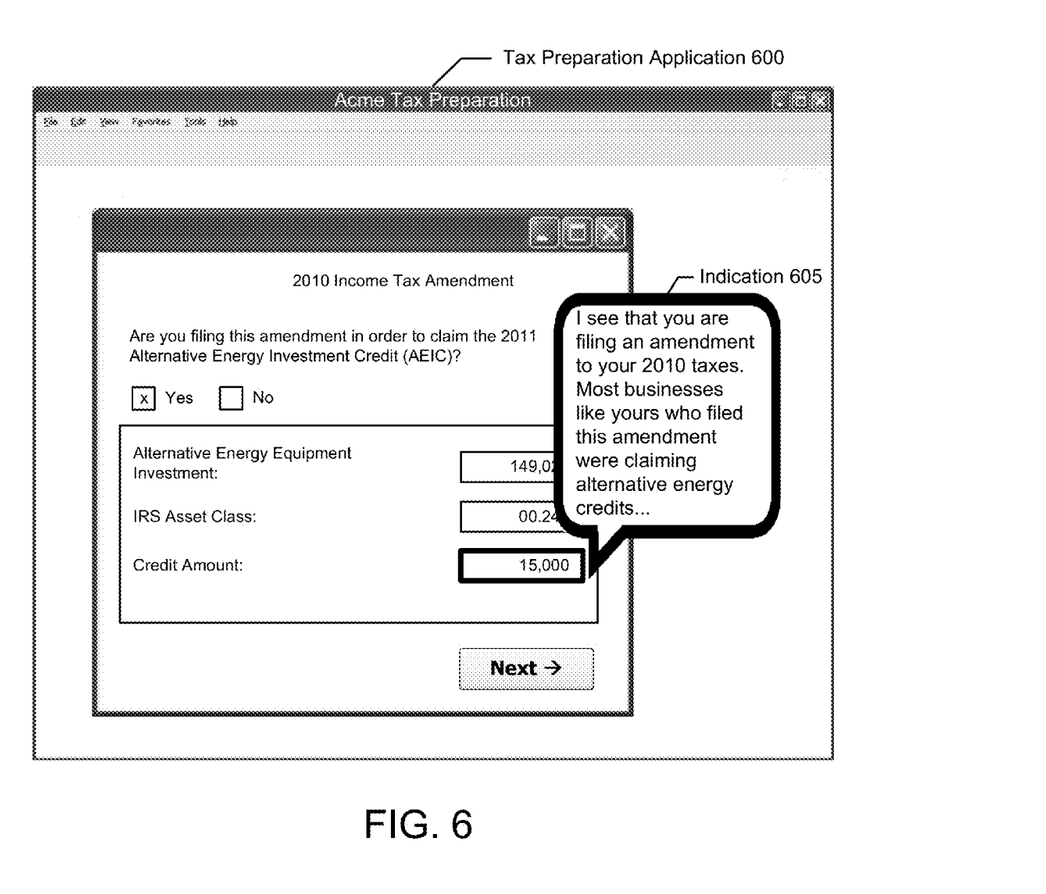
FIG. 6 shows a screenshot of a tax preparation application in accordance with one or more embodiments of the invention.

FIG. 6 depicts an example screenshot of a tax preparation application (600), in accordance with one or more embodiments of the invention. In this example, a user initiates a session with the tax preparation application (600) and launches a wizard in order to make an amendment to the user's 2010 business income tax return. Upon receiving a request to launch the wizard, the tax preparation application (600) retrieves a set of data containing the user's business tax returns for the past 3 years (2010, 2009, and 2008) as well as a set of expenditures for the current tax year (2011) and transmits them to an external forms server over a network.

In this example, the user's tax data includes geographic (e.g., a business address) and temporal data (e.g., filing dates of previous tax years, etc.). The tax forms server identifies a statistical threshold defining a set of terms corresponding to high efficiency equipment upgrades. The forms server performs a statistical analysis on the data and determines, based on an Internal Revenue Service (IRS) classification entered into a field on the previous year's tax returns, that the business industry of the user's business is industrial machinery. The forms server also then matches an expense amount of an expenditure within the current year's expenditures to a term among the set of terms defined by the statistical threshold.

Continuing the example, the forms server identifies another criterion defined by the statistical threshold. Based on this second criterion, the forms server identifies a new credit issued by the IRS during the current tax year (2011) which may be claimed retroactively for one or more previous years.

Based on the new credit, the forms server searches a set of 2010 income tax amendments for other businesses in the same industry and determines that at least 50% of 2010 income tax amendments filed by these other businesses within the past month have claimed the new credit retroactively. Based on the user's high-efficiency equipment upgrade expenditure, the new tax credit, and the percentage of businesses claiming the new credit for 2010 income tax amendments, the forms server determines that the statistical threshold is exceeded. The forms server then sends instructions to the tax preparation application (600) to populate a field in the wizard corresponding to the new credit with a default value. The default value is a credit amount calculated based on the expenditure. Furthermore, the tax preparation application (600) is instructed to display an indication (605) of the new credit as shown in the exemplary screenshot of FIG. 6.

Figure 7:
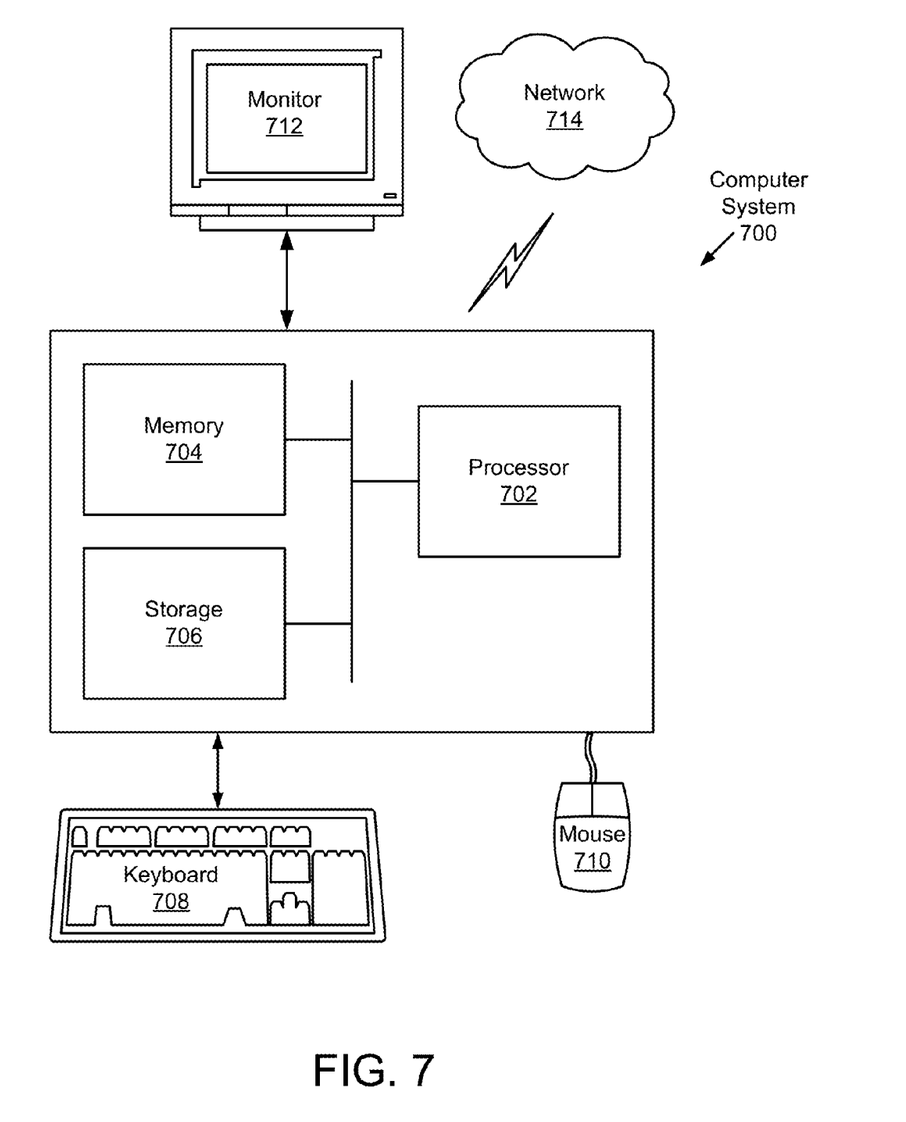
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) (such as a central processing unit (CPU), integrated circuit, hardware processor, etc.), associated memory (704) (e.g., RAM, cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g., analysis engine (105), forms repository (110), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By performing statistical analysis on data associated with a user and/or form and populating one or more fields on the form with one or more default values, it may be possible to increase efficiency in populating forms. As a result, by reducing the amount of manual data entry by the user, it may also be possible to reduce erroneous input, typographical errors, miscalculations, and/or other associated problems with manual data entry. Lastly, users may not have immediate access to all of the information used in the statistical analysis, and thus it may be possible to further reduce data entry time by automatically providing users with values necessary for completion of one or more forms.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for populating forms, comprising:
identifying a plurality of inputs to a form on a merchant website from a plurality of past users of the merchant website, wherein the form comprises a message field and a date field;
receiving, from a current user, a request to view the form;
identifying, in response to a selection of a product on the merchant website by the current user, a plurality of temporal data comprising a date when the request to view the form was received from the current user and a name of the current user from metadata within a browser operated by the current user;
identifying a geographic location of the current user based on an internet protocol (IP) address of a computing device of the current user;
performing, based on the geographic location and the plurality of temporal data comprising the date, a statistical analysis on the plurality of inputs by:
identifying a subset of the plurality of past users located within the geographic location;
identifying a subset of the plurality of inputs corresponding to the subset of the plurality of past users; and
calculating a percentage of the subset of the plurality of inputs comprising a name of an event;
determining, by a computer processor and based on the statistical analysis, that a statistical threshold corresponding to the message field and the date field on the form is exceeded;
calculating, in response to determining that that the statistical threshold is exceeded, a default value for the message field comprising the name of the event and the name of the current user; and
sending the default value and a date of the event to the computing device to populate the message field on the form and the date field on the form.

2. The method of claim 1, wherein determining that the statistical threshold is exceeded comprises:
comparing the percentage with a predefined percentage, wherein the predefined percentage is defined by the statistical threshold.

3. The method of claim 1, further comprising:
identifying, from a calendar of events, the event; and
displaying an indication of the event to the current user.

4. The method of claim 1, further comprising:
displaying, to the current user, the message field populated with the default value and the date field populated with the date of the event.

5. The method of claim 1, wherein performing the statistical analysis further comprises:

identifying a time period prior to the date in the temporal data, wherein the subset of the plurality of inputs were received within the time period.

6. A non-transitory computer-readable storage medium storing a plurality of instructions for populating forms, the plurality of instructions configured to execute on a processor and comprising functionality to:
- identify a plurality of inputs to a form on a merchant website from a plurality of past users of the merchant website, wherein the form comprises a message field and a data field;
- receive, from a current user, a request to view the form;
- identify, in response to a selection of a product on the merchant website by the current user, a plurality of temporal data comprising a date when the request to view the form was received from the current user and a name of the current user from metadata with a browser operated by the current user;
- identify a geographic location of the current user based on an internet protocol (IP) address of a computing device of the current user;
- perform, based on the geographic location and the plurality of temporal data comprising the date, a statistical analysis on the plurality of inputs by:
  - identifying a subset of the plurality of past users located within the geographic location;
  - identifying a subset of the plurality of inputs corresponding to the subset of the plurality of past users; and
  - calculating a percentage of the subset of the plurality of inputs comprising a name of an event;
- determine, based on the statistical analysis, that a statistical threshold corresponding to the message field and the data field on the form is exceeded;
- calculate, in response to determining that that the statistical threshold is exceeded, a default value for the message field comprising the name of the event and the name of the current user; and
- send the default value and a date of the event to the computing device to populate the message field on the form and the date field on the form.

7. The non-transitory computer-readable storage medium of claim 6, wherein determining that the statistical threshold is exceeded comprises:
- comparing the percentage with a predefined percentage, wherein the predefined percentage is defined by the statistical threshold.

8. The non-transitory computer-readable storage medium of claim 6, wherein the plurality of instructions further comprise functionality to:
- identify, from a calendar of events, the event; and
- display an indication of the event to the current user.

9. The non-transitory computer-readable storage medium of claim 6, wherein the instructions to perform the statistical analysis comprise functionality for:
- identifying a time period prior to the date in the temporal data, wherein the subset of the plurality of inputs were received within the time period.

10. A computer system for populating forms, comprising:
- a forms repository comprising a plurality of inputs to a form on a merchant website from a plurality of past users of the merchant website, wherein the form comprises a message field and a date field;
- a processor; and
- a forms server executing on the processor and comprising functionality to:
  - receive, from a current user, a request to view the form;
  - identify, in response to a selection of a product on the merchant website by the current user, a plurality of temporal data comprising a date when the request to view the form was received from the current user and a name of the current user from metadata within a browser operated by the current user;
  - identify a geographic location of the current user based on an internet protocol (IP) address of a computing device of the current user;
  - access the plurality of inputs in the forms repository;
  - perform, based on the geographic location and the plurality of temporal data comprising the date, a statistical analysis on the plurality of inputs by:
    - identifying a subset of the plurality of past users located within the geographic location;
    - identifying a subset of the plurality of inputs corresponding to the subset of the plurality of past users; and
    - calculating a percentage of the subset of the plurality of inputs comprising a name of an event;
  - determine, based on the statistical analysis, that a statistical threshold corresponding to the message field and the date field on the form is exceeded;
  - calculate, in response to determining that that the statistical threshold is exceeded, a default value for the message field comprising the name of the event and the name of the current user; and
  - send the default value and a date of the event to the computing device to populate the message field on the form and the date field on the form.

11. The system of claim 10, further comprising:
- a client application executing on the computing device and configured to:
  - send the request to the forms server;
  - receive the default value and the date of the event from the forms server; and
  - display, to the current user, the field populated with the default value.

12. The system of claim 10, further comprising:
- a calendar of events comprising the event,
- wherein the forms server is further configured to display an indication of the event to the current user.

13. The system of claim 10, wherein performing the statistical analysis further comprises:
- identifying a time period prior to the date in the temporal data, wherein the subset of the plurality of inputs were received within the time period.

* * * * *